(12) United States Patent
Maeng

(10) Patent No.: US 12,008,576 B2
(45) Date of Patent: *Jun. 11, 2024

(54) MOBILE WALLET APPLICATION WITH PAYMENT RECEIPT SUPPORT

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,992

(22) Filed: Apr. 5, 2023

(65) Prior Publication Data

US 2023/0245132 A1 Aug. 3, 2023

Related U.S. Application Data

(63) Continuation of application No. 17/248,646, filed on Feb. 1, 2021, now Pat. No. 11,682,022, which is a
(Continued)

(51) Int. Cl.
*G06Q 20/40* (2012.01)
*G06Q 20/20* (2012.01)
*G06Q 20/36* (2012.01)

(52) U.S. Cl.
CPC ......... *G06Q 20/405* (2013.01); *G06Q 20/202* (2013.01); *G06Q 20/36* (2013.01)

(58) Field of Classification Search
CPC ........ G06Q 20/00; G06Q 20/02; G06Q 20/04; G06Q 20/10; G06Q 20/108; G06Q 20/20;
(Continued)

(56) References Cited

U.S. PATENT DOCUMENTS 8,095,438 B2 * 1/2012 Carroll .................. G06Q 40/00
705/64
8,606,662 B2 12/2013 Tomchek et al.
(Continued)

OTHER PUBLICATIONS

"U.S. Appl. No. 15/629,455, Examiner Interview Summary dated Feb. 18, 2020", 3 pgs.
(Continued)

*Primary Examiner* — Olusegun Goyea
(74) *Attorney, Agent, or Firm* — SCHWEGMAN LUNDBERG & WOESSNER, P.A.

(57) ABSTRACT

Various examples described herein are directed to systems and methods for managing payments of a first merchant. A mobile wallet application may receive first payment element data describing a first payment element for making a first payment and may determine that the first payment element is to be processed by a limited payment network. The mobile wallet application may send a first payment authorization message to an issuer of the first payment element via the limited payment network. The mobile wallet application may also receive second payment element data describing a second payment element for making a second payment. The mobile wallet application may determine that the second payment element is not to be processed by the limited payment network, and send a second payment authorization message to an issuer of the second payment element via a second payment network.

20 Claims, 12 Drawing Sheets

Related U.S. Application Data continuation of application No. 15/629,455, filed on Jun. 21, 2017, now Pat. No. 10,909,541.

(58) Field of Classification Search
CPC ...... G06Q 20/202; G06Q 20/26; G06Q 20/32; G06Q 20/38; G06Q 20/40; G06Q 30/00; G06Q 30/38; G06F 17/30; G06F 17/40
USPC .... 705/14.1, 14.27, 14.4, 17, 21, 26.1, 26.8, 705/30, 39, 41, 44, 67; 235/375, 380
See application file for complete search history.

(56) References Cited

U.S. PATENT DOCUMENTS

| | | | |
|---|---|---|---|
| 9,530,125 B2* | 12/2016 | Bacastow | G06Q 20/4012 |
| 9,773,236 B2 | 9/2017 | Mohsenzadeh | |
| 9,799,028 B2* | 10/2017 | Dickelman | G06Q 20/08 |
| 9,836,728 B1* | 12/2017 | Brennan | G06Q 20/108 |
| 10,127,537 B1* | 11/2018 | Ellis | G06Q 20/36 |
| 10,176,468 B1 | 1/2019 | Dickelman | |
| 10,360,559 B1* | 7/2019 | Dickelman | G06Q 30/04 |
| 10,657,502 B2* | 5/2020 | Dheer | G06Q 20/10 |
| 10,909,541 B1 | 2/2021 | Maeng | |
| 2008/0114699 A1 | 5/2008 | Yuan | |
| 2009/0006262 A1* | 1/2009 | Brown | H04L 9/32 705/64 |
| 2009/0144163 A1* | 6/2009 | Dickelman | G06Q 30/06 705/17 |
| 2009/0144166 A1* | 6/2009 | Dickelman | G06Q 20/20 705/39 |
| 2009/0144170 A1* | 6/2009 | Dickelman | G06Q 20/20 705/26.1 |
| 2009/0150276 A1* | 6/2009 | Dickelman | G06Q 40/00 705/35 |
| 2009/0164380 A1* | 6/2009 | Brown | G07F 7/12 705/65 |
| 2009/0254462 A1* | 10/2009 | Tomchek | G06Q 20/405 707/E17.014 |
| 2010/0301114 A1* | 12/2010 | Lo Faro | G06Q 20/357 235/380 |
| 2011/0071892 A1* | 3/2011 | Dickelman | G06Q 20/20 705/14.17 |
| 2012/0016728 A1* | 1/2012 | Ahmad | G06Q 20/10 707/769 |
| 2013/0054338 A1* | 2/2013 | Merz | G06Q 30/0224 705/14.27 |
| 2013/0073744 A1* | 3/2013 | Ratica | G06F 9/4451 709/240 |
| 2014/0012701 A1* | 1/2014 | Wall | G06Q 20/3224 705/26.8 |
| 2014/0019274 A1 | 1/2014 | Hardin et al. | |
| 2014/0025567 A1* | 1/2014 | Rigby | G06Q 20/10 705/39 |
| 2014/0054369 A1* | 2/2014 | Liberty | G06Q 20/3274 235/379 |
| 2014/0074724 A1* | 3/2014 | Gordon | G06Q 20/023 705/44 |
| 2014/0279525 A1* | 9/2014 | Mohsenzadeh | G06Q 20/24 705/44 |
| 2015/0019320 A1* | 1/2015 | Menendez | G06Q 30/0231 705/14.31 |
| 2015/0046338 A1* | 2/2015 | Laxminarayanan | G06Q 20/38215 705/67 |
| 2015/0095225 A1* | 4/2015 | Appana | G06Q 20/227 705/41 |
| 2015/0254639 A1* | 9/2015 | Radu | G06Q 20/36 705/41 |
| 2015/0332240 A1* | 11/2015 | Harwood | G06Q 20/3224 705/21 |
| 2016/0048864 A1* | 2/2016 | Beer | G06Q 30/0226 705/14.27 |
| 2016/0092858 A1* | 3/2016 | Giles | G06Q 20/227 705/14.1 |
| 2017/0017958 A1* | 1/2017 | Scott | G06Q 20/40 |
| 2017/0352013 A1* | 12/2017 | Nogin | G06Q 20/405 |
| 2018/0053163 A1* | 2/2018 | Khanani | G06Q 20/3274 |

OTHER PUBLICATIONS

"U.S. Appl. No. 15/629,455, Non Final Office Action dated Jun. 11, 2020".

"U.S. Appl. No. 15/629,455, Non Final Office Action dated Nov. 29, 2019", 10 pgs.

"U.S. Appl. No. 15/629,455, Notice of Allowance dated Oct. 1, 2020".

"U.S. Appl. No. 15/629,455, Response filed Mar. 2, 2020 to Non Final Office Action dated Nov. 29, 2019", 12 pgs.

"U.S. Appl. No. 15/629,455, Response filed Sep. 10, 2020 to Non Final Office Action dated Jun. 11, 2020".

"U.S. Appl. No. 17/248,646, Non Final Office Action dated Oct. 14, 2022".

"U.S. Appl. No. 17/248,646, Notice of Allowance dated Feb. 8, 2023".

"U.S. Appl. No. 17/248,646, Response filed Jan. 11, 2023 to Non Final Office Action dated Oct. 14, 2022".

\* cited by examiner

MOBILE WALLET APPLICATION WITH PAYMENT RECEIPT SUPPORT

CROSS-REFERENCE TO RELATED APPLICATION

This application is a continuation of U.S. patent application Ser. No. 17/248,646, filed Feb. 1, 2021, which is a continuation of U.S. patent application Ser. No. 15/629,455, filed Jun. 21, 2017, now issued as U.S. Pat. No. 10,909,541, each of which are incorporated by reference herein in their entirety.

TECHNICAL FIELD

Embodiments described herein generally relate to systems and methods for generating communicating data structures indicating payments directed to and from mobile wallet applications.

BACKGROUND

Mobile wallet applications are used to make payments. For example, a consumer may execute a mobile wallet application on a user computing device and use the mobile wallet application to provide payments to merchants for goods and services.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
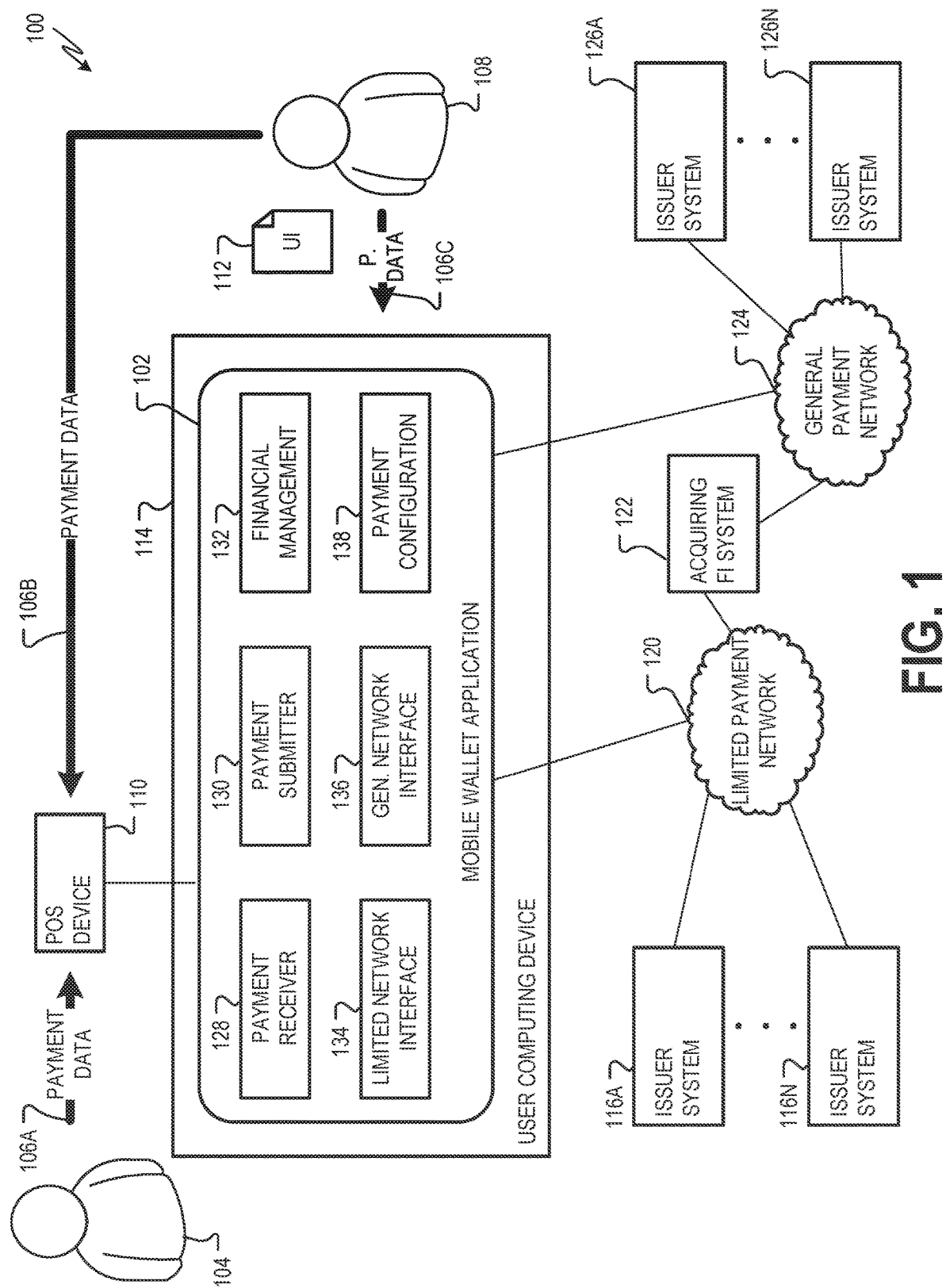
FIG. 1 is a diagram showing one example of an environment for a mobile wallet application.

Various examples described herein are directed to systems and methods for mobile wallet applications that support the receipt of payments from third parties. Mobile wallet applications with payment receipt support may be used, for example, by merchants to receive payments from customers and/or make payments to vendors.

In non-cash payments to a payee (e.g., a merchant) from a payer (e.g., a customer of the merchant), the payer provides a payment element associated with a credit, deposit, or other account of the payer from which the payment will be drawn. For example, the payment element may be or represent a credit card account, a checking account, a savings account, etc. The payee uses a payment network to authorize and clear the transaction. For example, the payee may request authorization for the payment from the financial institution that issued the payer's payment element (e.g., the issuer financial institution or issuer). If the payment is approved, the issuer clears the payment by crediting an amount of the payment to an account of the payee at an acquiring financial institution. The payment network provides a communication link between a payee and an issuer that allows the payee to request payment authorization and clearance, for example, in a standardized way.

General payment networks, such as the PLUS network, the CIRRUS network, VisaNet, etc., typically include hardware and/or software infrastructure to support communications between payees and a large number of issuers. In this way, a merchant may utilize one general payment network to accept payments via payment elements from many different issuers. Many general payment networks charge use fees including, for example, per transaction fees and, in some cases, a fraction of the payment amount.

In various examples described herein, a mobile wallet application may be configured to utilize a limited payment processing network. A limited payment processing network includes hardware and/or software infrastructure to support communications between a payee and a limited set of payment element issuers. The limited payment network may provide various benefits to the payee including, for example, lower fees for use.

A limited payment network may take various forms. In some examples, where a mobile wallet application is a payee, the limited payment network includes a connection between a mobile wallet application and a mobile wallet provider system associated with a financial institution that is both the issuer financial institution and the acquiring financial institution for a payment. Accordingly, the mobile wallet application may request authorization and clearance of a payment via the connection to the wallet provider service (e.g., without using the general payment network). In other examples, the limited payment network includes a mobile wallet provider system that is in communication with multiple financial institution systems, which may be issuers and/or acquiring financial institutions for a payment. The wallet management system may direct authorization requests and transfer requests between the merchant mobile wallet application and the various financial institutions.

The mobile wallet application may be programmed to receive a payment data indicating a first payment to the mobile wallet application. The payment data may include, for example, payment element data describing a payment element for the payment and a payment amount. The mobile wallet application may determine whether the payment is to be processed by a limited payment network or a general payment network. For example, the mobile wallet application may determine whether the issuer of the payment element participates in the limited payment network. If so, then the payment is processed using the limited payment network. If not, the payment is processed using the general payment network. Because use fees for the limited payment network may be lower, this may reduce the costs of the merchant, incenting the merchant to use the merchant mobile wallet.

FIG. 1 is a diagram showing one example of an environment 100 for a mobile wallet application 102. The mobile wallet application 102 is executed at a user computing device 114. The user computing device 114 may be any suitable computing device such as, for example, a smart phone, a tablet computer, a laptop computer, a smart watch, etc. The mobile wallet application 102 may be utilized by a user 108 via a user interface (UI) 112 provided by the mobile wallet application 102. In some examples, the user 108 is, or is associated with, a merchant, such as a small business.

The mobile wallet application 102 includes various systems 128, 130, 132, 134, 136, 138 for providing services to a user 108. The systems 128, 130, 132, 134, 136, 138 may be implemented, for example, as software modules that are subcomponents of the mobile wallet application 102. In some examples, one or more of the systems 128, 130, 132, 134, 136, 138 are implemented outside of the mobile wallet application 102, for example, as a separate application in communication with the mobile wallet application 102, for example, executed at the user computing device 114 or a different device in communication with the user computing device 114.

A payment submitter system 130 may be programmed to make outgoing payments from the mobile wallet application 102 (e.g., payments where the mobile wallet application 102 or user 108 is the payer). For example the payment submitter system 130 may provide an outgoing payment request message to a Point-of Sale (POS) device, a web server, or other device or application of a payee that is to receive the outgoing payment. The outgoing payment request may include merchant payment element data describing a merchant payment element that will be used to make the payment. A financial management system 132 may be programmed to provide various financial functionality to the user 108 such as, for example, accounting functions, tax functions, inventory management functions, etc. Additional details of example mobile wallet applications, such as the mobile wallet application 102, are described herein, for example, with respect to FIG. 5.

The mobile wallet application 102 may also include various systems for receiving incoming payments (e.g., payments where the mobile wallet application 102 and/or user 108 is the payee). A payment receiver system 128 may be programmed to receive payment data describing an incoming payment. Payment data may be received from a payer user 104, and/or from the user 108. The payer user 104, for example, may be a customer making a payment to the user 108 (and/or an associated merchant or other enterprise) for goods and/or services rendered.

Payment data may describe the payment made by the payer user 104 to the payee (e.g., the user 108 or other proprietor of the mobile wallet application 102). Payment data may include, for example, payment element data describing a payment element from which the payment will be debited and payment amount data indicating an amount of the payment. In some examples, payment data may also include a payment element credential such as a user name, password, personal identification number (PIN), or other suitable credential indicating that the payer user 104 is authorized to utilize the payment element.

In some examples, the payer user 104 provides payment data 106A to the mobile wallet application 102 via POS device 110. The POS device 110 may be any suitable device for receiving payment data from a payer user 104 and/or the user 108. In some examples, the POS device 110 is or includes a stand-alone credit card reader device in communication with the user computing device 114, a card reader attachment for the user computing device 114, such as the Square® device from Square, Inc., various card reader devices available from PayPal, Inc., etc. In some examples, the payer user 104 has a physical card having a magnetic strip, an EMV chip, Radio Frequency identification (RFID) device, or other medium carrying payment element data that is read by the POS device 110 and/or the user computing device 114 itself.

The payment data 106A provided via the POS device 110 by the payer user 104 may include, for example, payment element data and, in some examples, payment element credential data. In some examples, the payer user 104 may also provide a payment amount. In other examples, the payment amount is provided to the POS device 110 as part of payment data 106B provided by the user 108. For example, the user 108 may set the payment amount at the POS device 110 and then invite the user to swipe, insert, or otherwise provide payment element data and/or payment credential data. In some examples, the user 108 may provide the payment amount with payment data 106C provided to the mobile wallet application (e.g., the payment receiver system 128) via the UI 112.

In some examples, the payer user 104 has a user computing device executing a mobile wallet application (a payer mobile wallet application). The payer mobile wallet application may provide payment element data to the POS device 110 and/or directly to the payment receiver system 128, for example, via Near Field Communication (NFC), Bluetooth®, Bluetooth® LE, or any other suitable wired or wireless protocol. In addition to the payment element data, payment data 106 may also include a payment amount. The payment amount may be provided by the payer user 104 or, in some examples, may be provided by the user 108 via the UI 112.

The mobile wallet application 102 may initiate the payment described by payment data 106A, 106B, and/or 106C, for example, via a general payment network 124 or by a limited payment network 120. A general network interface system 136 of the mobile wallet application 102 may be programmed to manage communications with the general payment network 124.

The general payment network 124 may include hardware and/or software to support communications between the mobile wallet application 102 and various issuer systems 126A, 126N. For example, the issuer systems 126A, 126N may be or include computing devices associated with financial institutions that issue payment elements. To use the general payment network 124, the mobile wallet application 102 may send a payment authorization message to the general payment network 124. The payment authorization message may include the payment element data and, in some examples, payment credential data received from the payer user 104.

The general payment network 124 routes the payment authorization request to the issuer system 126A, 126N that issued the payment element. The issuer system 126A, 126N may respond by either authorizing the payment or declining the payment. For example, the payment may be authorized if the payer user's account associated with the payment element has sufficient funds or credit to cover the payment and/or if the payment otherwise complies with the terms of the payment element. If the payer user's account associated with the payment element lacks sufficient funds or credit to cover the payment, or if the payment otherwise fails to comply with the terms of the payment element, the payment may be declined. If the payment is accepted, the issuer system 126A, 126N debits the account associated with the payment element and credits a payee account by providing a credit message to an acquiring financial institution system 122 via the general payment network 124.

A limited network interface system 134 of the mobile wallet application 102 may be programmed to manage communications with a limited payment network 120. To process the payment with the limited payment network 120, the mobile wallet application 102 (e.g., limited network interface system 134) may provide a payment authorization message to the limited payment network 120. The payment authorization message may include the payment element data and, in some examples, payment credential data received from the payer user 104.

Issuer systems 116A, 116N may be part of a set of one or more issuers that permit and/or support payments via the limited payment network (for example, an issuer or issuers that support payments made via the limited payment network 120). The limited payment network 120 also routes the payment authorization request to an appropriate issuer system 116A, 116N (e.g., the issuer system corresponding to the payment element). The issuer system 116A, 116N may respond by authorizing or declining the payment. If the payment is accepted, the issuer system 116A, 116N debits the account associated with the payment element.

The issuer systems 116A-N, 126A-N are shown to communicate on a single network (e.g., issuer systems 116A-N on the limited payment network 120 and issuer systems 126A-N on the general payment network 124). In some examples, a single issuer system 116A-N, 126A-N may alternately communicate on the limited payment network 120 and on the general payment network 124. For example, an issuer system 116A-N, 126A-N may operate on the limited payment network 120 when receiving a payment from a payment element issued by the same issuer system 116A-N, 126A-N (or an associated issuer) and on the general payment network 124 when receiving a payment element issued by another issuer.

The payment configuration system 138 of the mobile wallet application 102 may determine the configuration of an incoming payment, for example, to determine whether the incoming payment will be processed by the limited payment network 120 or the general payment network 124. The payment configuration system 138, for example, may determine a payment element described by payment data 106A, 106B. The payment configuration system 138 may determine an issuer of the indicated payment element and compare the issuer to one or more issuers supported by the limited payment network.

Figure 2:
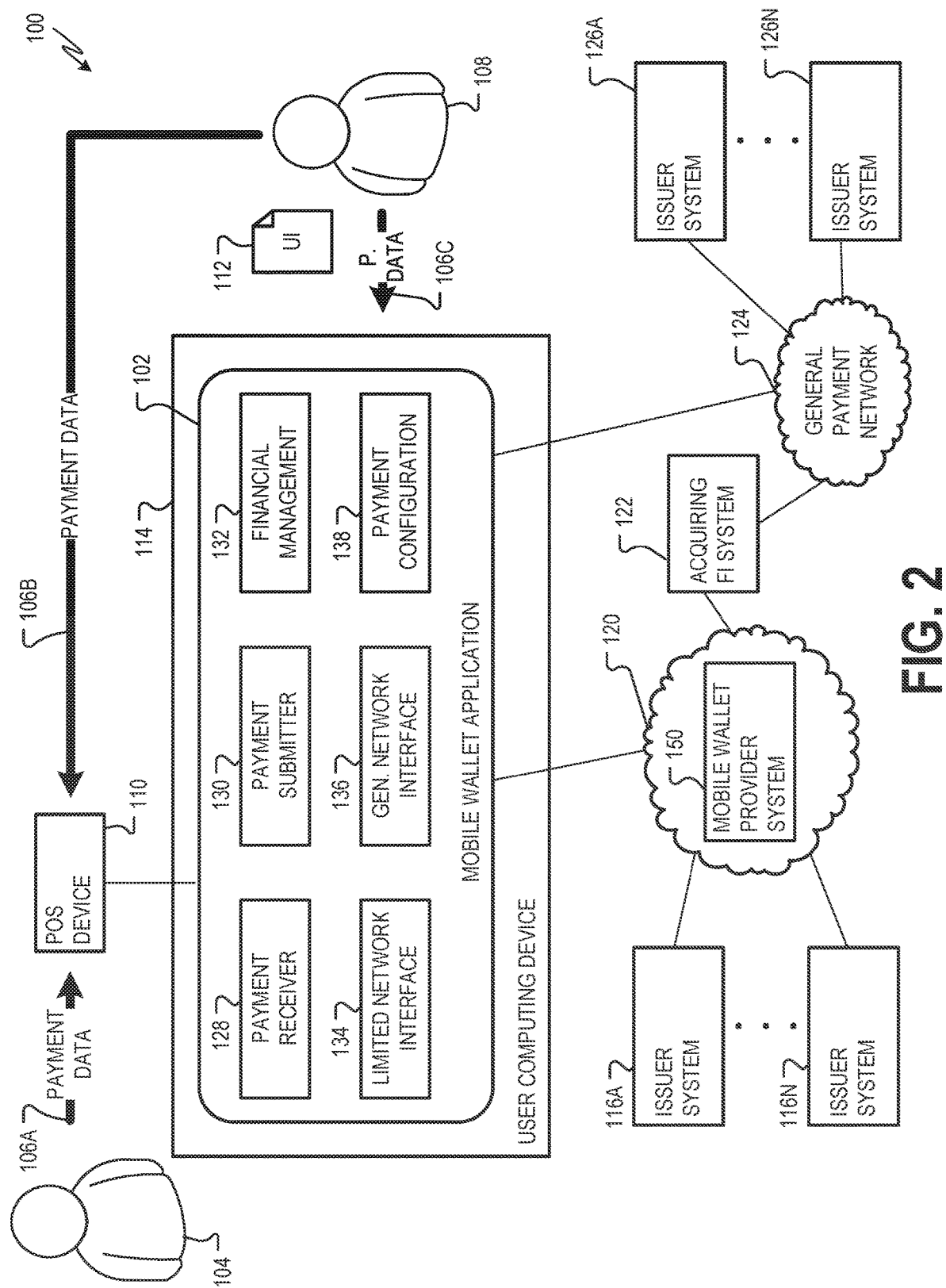
FIG. 2 is a diagram showing another example of the environment of FIG. 1 with an alternate arrangement of the limited payment network.

FIG. 2 is a diagram showing another example of the environment 100 of FIG. 1 with an alternate arrangement of the limited payment network 120. In the example of FIG. 2, the limited payment network 120 comprises a mobile wallet provider system 150. The mobile wallet provider system 150 may be implemented by a mobile wallet provider such as a financial institution, a technology company, a software company that developed and/or distributed the mobile wallet application 102, etc. The mobile wallet provider system 150 may be in communication with the issuer systems 116A-116N and may provide authorization request messages to the issuer systems 116A, 116N as described herein. In some examples, the mobile wallet provider system 150 may also provide financial functionality to the user 108, for example, via the financial management system 132 as described herein.

Figure 3:
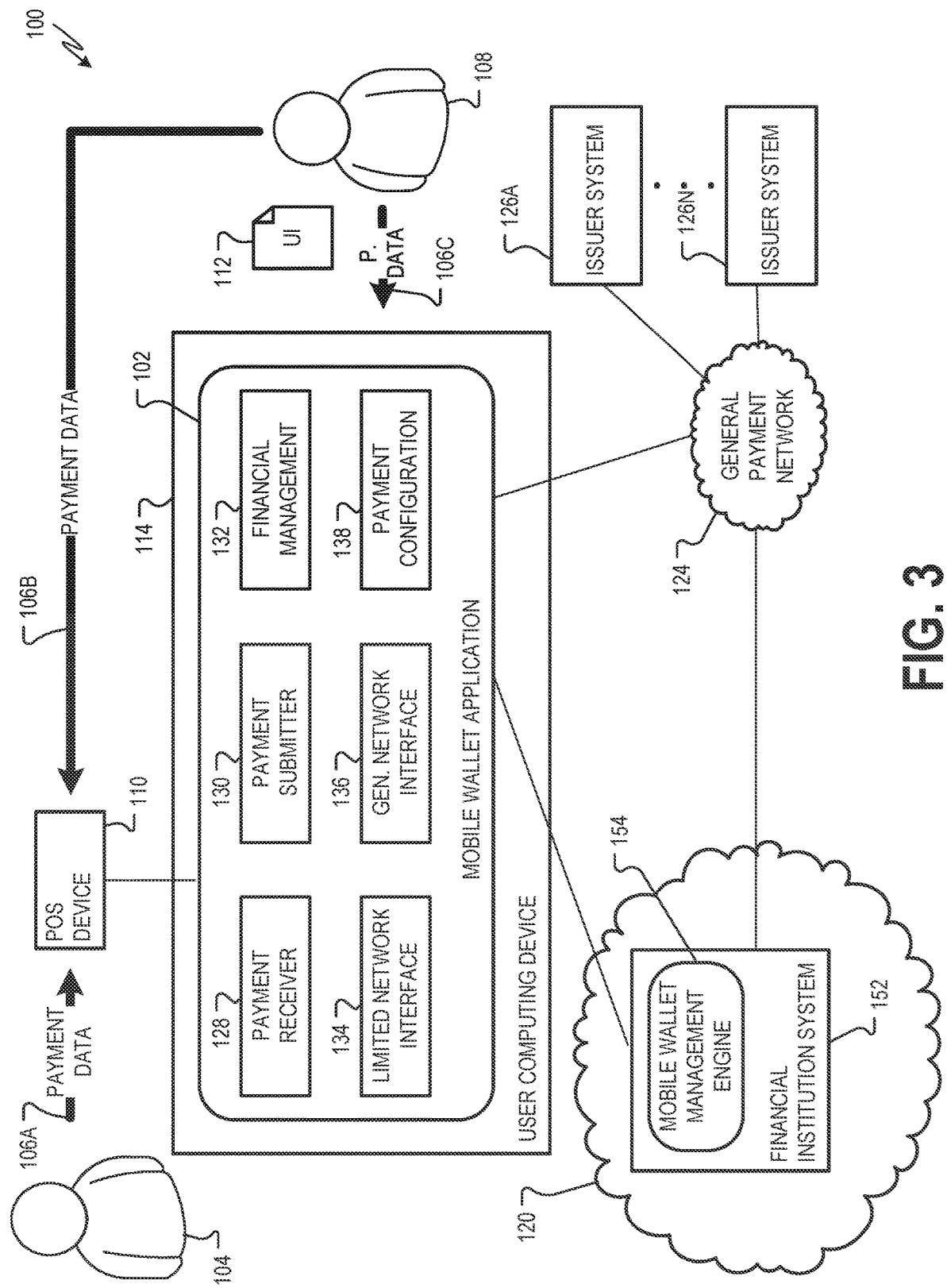
FIG. 3 is a diagram showing another example of the environment of FIG. 1 with yet another alternate arrangement of the limited payment network.

FIG. 3 is a diagram showing another example of the environment 100 of FIG. 1 with yet another alternate arrangement of the limited payment network 120. In the example of FIG. 3, the limited payment network 120 includes a financial institution system 152 that may be associated with a financial institution. The mobile wallet application 102 may communicate directly with the financial institution system 152. For example, the mobile wallet application 102 may send a payment request message to the financial institution system 152 in cases where the financial institution associated with the financial institution system 152 is the issuer for the payment element of the payment. The financial institution system 152 may authorize or decline the payment and may send to the mobile wallet application 102 a message indicating the status of the payment (e.g., authorized or declined). In this example, the financial institution associated with the financial institution system 152 may be both the issuer and the acquiring bank for the payment.

The financial institution system 152 may include a mobile wallet management engine 154 which may provide various management and other services to the mobile wallet application 102. For example, the mobile wallet management engine 154 may receive and distribute payment authorization requests. In some examples, the mobile wallet management engine 154 may also provide financial services to the mobile wallet application 102, for example, via the financial management system 132.

Figure 4:
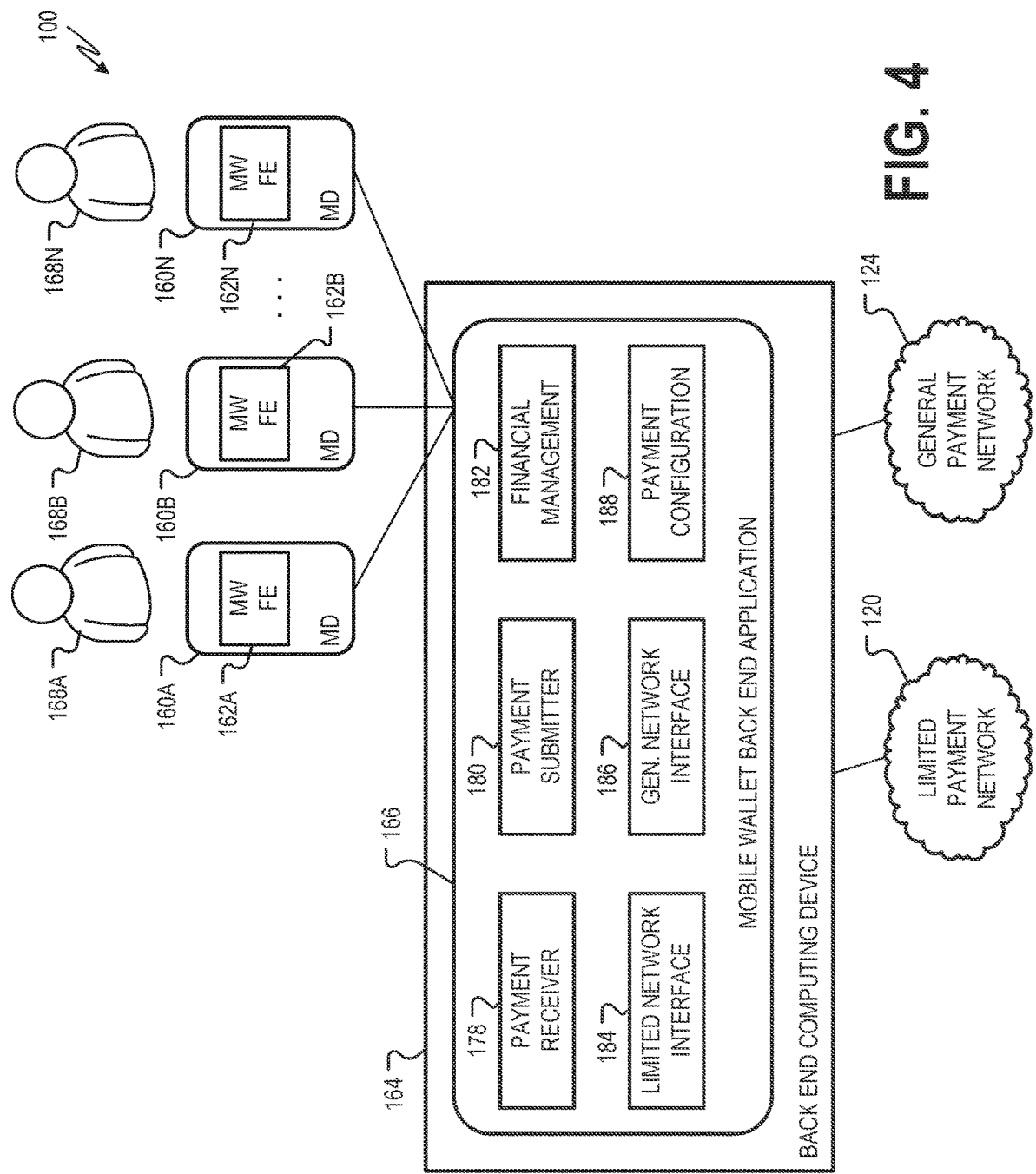
FIG. 4 is a diagram showing another example of the environment of FIG. 1 arranged with a client/server mobile wallet configuration.

FIG. 4 is a diagram showing another example of the environment 100 of FIG. 1 arranged with a client/server mobile wallet configuration. In the example of FIG. 4, a mobile wallet back end application 166 executes at a back end computing device 164. The back end computing device 164, for example, may be any suitable physical server, virtual machine-implemented server, etc. The mobile wallet back end application 166 is in communication with one or more mobile wallet client applications 162A, 162B, 162N. Mobile wallet front end applications 162A, 162B, 162N may execute at user computing devices 160A, 160B, 160N. The mobile wallet front end applications 162A, 162B, 162N may provide functionality of the mobile wallet application 102 to users 168A, 168B, 168N. For example, users 168A, 168B, 168N may be associated with a common merchant. Mobile wallet front end applications 162A, 162B, 162N may allow multiple users 168A, 168B, 168N to make outgoing and/or receive incoming payments via the limited payment network 120.

The mobile wallet back end application 166 may include a payment receiver system 178, which may operate to receive payment data in a manner similar to that described above with respect to the payment receiver system 128. The mobile wallet back end application 166 may also include a payment submitter system 180, which may operate to submit outgoing payments similar to the payment submitter system 130 described herein. For example, the mobile wallet back end application 166 may receive an outgoing payment request message from a mobile wallet front end application 162A, 162B, 162N. The mobile wallet back end application 166 may provide the outgoing payment request message, for example, to a device, to a web server, or other device or application of a payee that is to receive the outgoing payment. In some examples, a mobile wallet front end application 162A, 162B, 162N may provide merchant payment element data describing a merchant payment element to be used for the outgoing payment. Also, in some examples, the mobile wallet back end application 166 may select a merchant payment element and incorporate merchant payment element data describing the selected merchant payment element into the outgoing payment request message.

A financial management system 182 may operate to provide financial services to the users 168A. 168B, 168N, for example, as described herein. A limited network interface system 184 may interface with the limited payment network 120, for example, as described herein. A general payment network interface system 186 may interface with the general payment network 124, for example, as described herein. A payment configuration system 188 may receive payment data and determine whether to submit payment authorization request messages via the limited payment network 120 or the general payment network 124.

In the example of FIG. 4, the systems 178, 180, 182, 184, 186, 188 are executed at the mobile wallet back end computing device 164. Mobile wallet front end applications 162A, 162B, 162N may be in communication with the back end computing device 164 to access the systems 178, 180, 182, 184, 186, 188, for example. In other configurations, examples of some or all of the systems 178, 180, 182, 184, 186, 188 may execute at the individual mobile devices 160A, 160B, 160N, 4 shows an example limited payment network 120 and general payment network 124. It will be appreciated that the client server mobile wallet configuration of FIG. 4 may be practiced with any suitable configuration of the limited payment network 120 including, for example, those shown in FIGS. 1-3.

Figure 5:
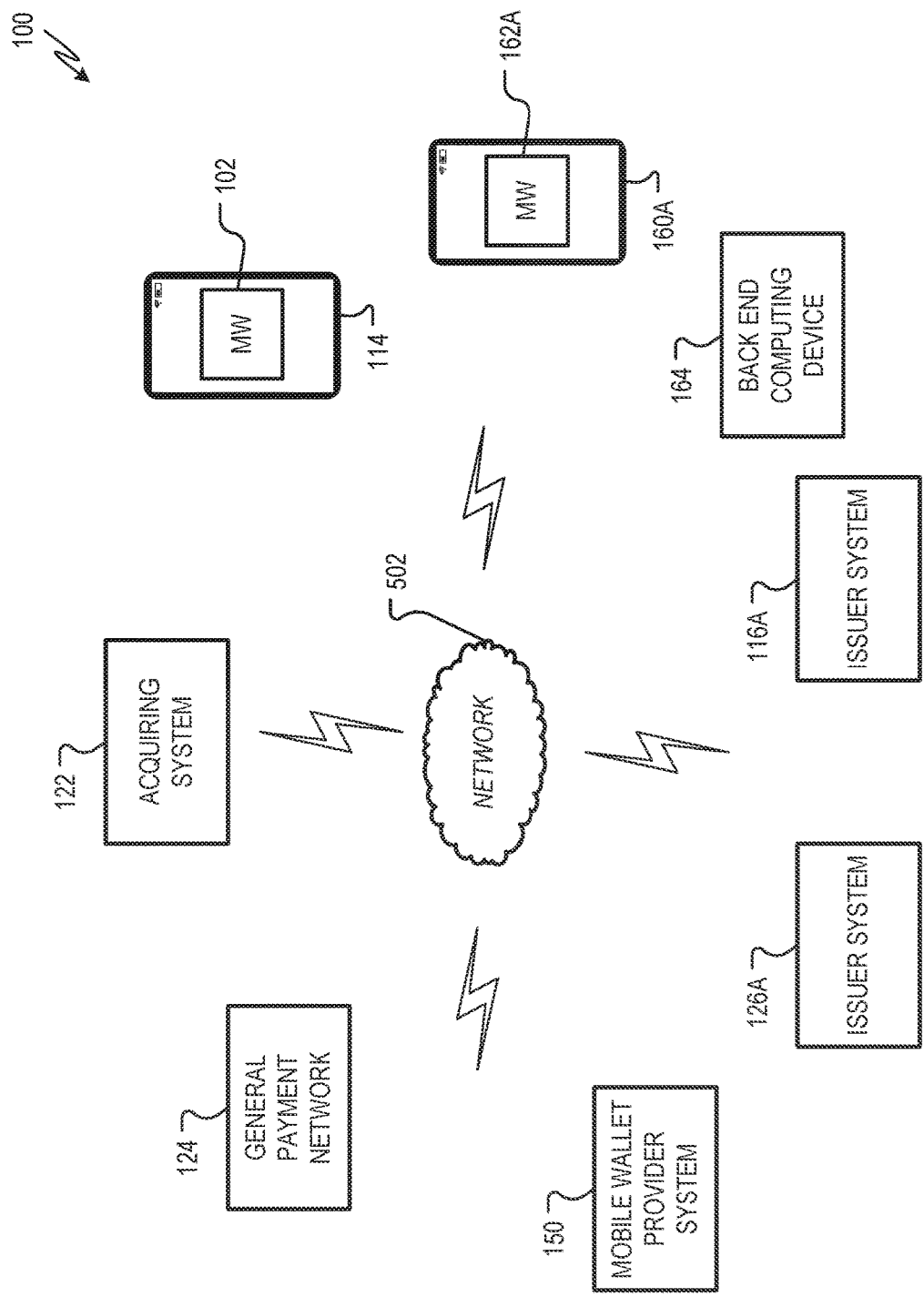
FIG. 5 is a diagram showing one example of the environment with additional details.

FIG. 5 is a diagram showing one example of the environment 100 with additional details. FIG. 5 shows the general payment network 124, acquiring financial institution system 122, the user computing device 114 and mobile wallet application 102, the user computing device 160A and mobile wallet application 162A, the issuer system 116A, the issuer system 126A, the mobile wallet provider system 150, and back end computing device 164. The various components of the environment 100 may be in communication with one another via a network 502. The network 502 may be or comprise any suitable network element operated according to any suitable network protocol. For example, one or more portions of network 502 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a network, a WiMax network, another type of network, or a combination of two or more such networks.

Figure 6:
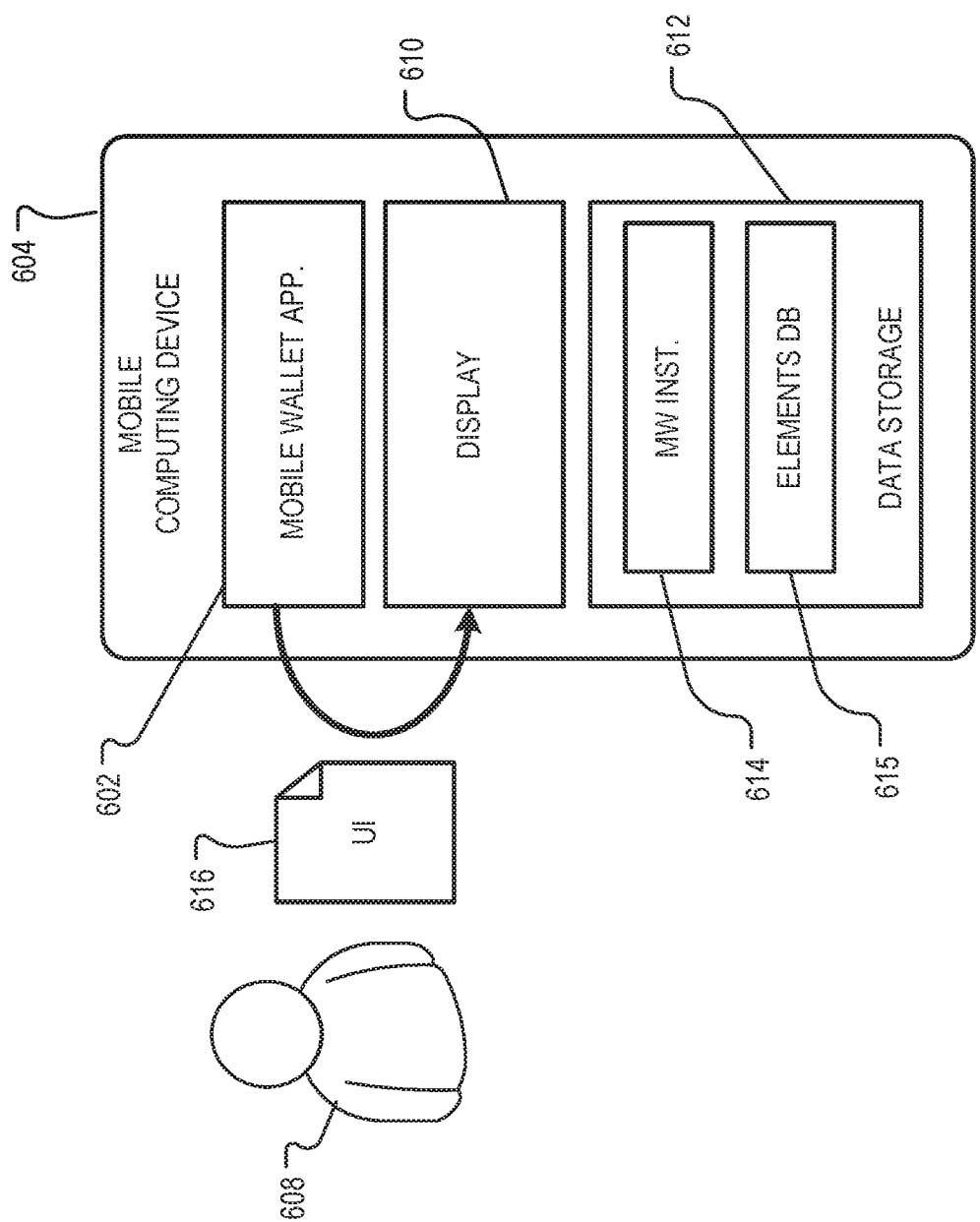
FIG. 6 is a diagram showing one example of a user computing device executing a mobile wallet application.

FIG. 6 is a diagram showing one example of a user computing device 604 executing a mobile wallet application 602. The mobile wallet application 602 may be an example of the mobile wallet application 102 and/or the mobile wallet front end applications 162A, 162B, 162N described above. The mobile wallet application 602 (sometimes referred to herein as a mobile wallet), may be executed by a processing unit of the user computing device 604. The mobile wallet application 602 may be programmed to manage mobile wallet elements, including payment elements and non-payment elements. Payment elements may be and/or reference user accounts that can fund a payment, including, for example, credit card accounts, debit accounts, checking accounts, savings accounts, gift cards or other pre-paid cards, cashier's checks, digital currency, etc. For example, a user 608 may utilize the mobile wallet application 602 to make online and/or in-person payments from payment elements. Non-payment elements may be and/or reference user accounts, memberships, etc., that do not include funds for making a payment. Examples of non-payment elements include employee cards, insurance cards, membership cards, and driver's licenses. The user 608 may utilize the mobile wallet application 602 to present non-payment elements, for example, as proof of identity, to receive a service, etc. Example mobile wallet applications include, but are not limited to, APPLE PAY®, ANDROID PAY®, GOOGLE WALLET®, CURRENT C® by MCX®, SAMSUNG PAY®, PAYPAL®, retailer-specific mobile wallet applications such as the STARBUCKS® App, and peer-to-peer payment apps such as VENMO®, SQUARE CASH®, and TILT APP®.

The user computing device 604 may be any suitable computing device for executing a mobile wallet application 602. Example user computing devices 604 may include smart phones, tablet computers, laptop computers, smart watches, etc. The user computing device 604 may comprise data storage 612, which may store data for executing the mobile wallet application 602 as described herein. For example, the data storage 612 may store mobile wallet instructions 614. A processing unit of the user computing device 604 may execute the mobile wallet instructions 614 to implement the mobile wallet application 602. (See FIGS. 11-13 for examples of processors and other processing units in computing devices.) The data storage 612 may also store other data for the mobile wallet application 602 including, for example, at an elements database 615. The elements database 615 may comprise data describing one or more payment or non-payment elements of the mobile wallet application 602. Data stored at the elements database 615 may include, for example, identification data uniquely identifying an element, historical usage data describing past uses of an element by the mobile wallet application 602, usage policy data describing when an element may be used, etc.

The user computing device 604 may also comprise a display 610. The display 610 may be or include any suitable type of display including, for example, a liquid crystal display (LCD), an organic light emitting diode (OLED) display, etc. In some examples, the display 610 is a touchscreen or other touch-sensitive display allowing the user 608 to provide input to a user interface (UI) 616. In some examples, the mobile wallet application 602 is programmed to generate a UI 616, which may be a graphical user interface (GUI). The UI 616 may be generated by the mobile wallet application 602 and displayed at the display 610. The user 608 may provide input via the UI 616 using the touchscreen. Also, in some examples, the user 608 may provide input to the UI 616 using various other input devices of the user computing device 604 in addition to or instead of using a touchscreen. Other input devices may include, for example, a mouse, a track ball, etc.

Figure 7:
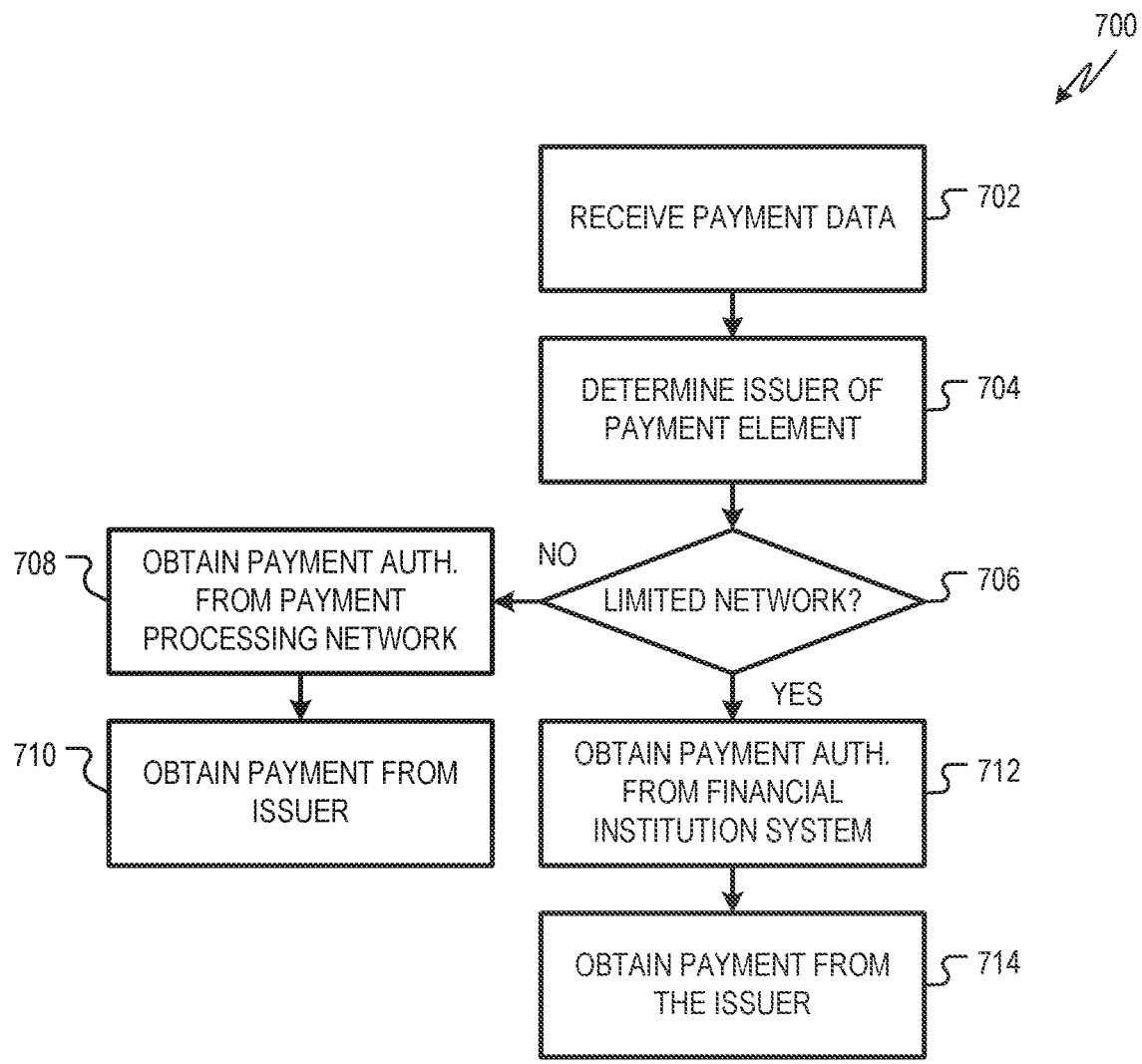
FIG. 7 is a flowchart showing one example of a process flow for processing an incoming payment to a mobile wallet application.

FIG. 7 is a flowchart showing one example of a process flow 700 for processing an incoming payment to a mobile wallet application. In some examples, the process flow 700 may be executed by the mobile wallet application 102 of FIG. 1. Also, in some examples, the process flow 700 may be executed in the client/server mobile wallet configuration of FIG. 4. In these examples, some or all of the operations of the process flow 700 are executed at the mobile wallet back end application 166 and/or at one of the mobile wallet front end applications 162A, 162B, 162N. Accordingly, when operations of the process flow 700 are described as being executed by a mobile wallet application, those operations may be executed by the mobile wallet application 102, the mobile wallet back end application 166 and/or the mobile wallet front end applications 162A, 162B, 162N.

At operation 702, the mobile wallet application receives payment data, such as the payment data 106A, 106B, 106C. Payment data may include payment element data describing a payment element, payment element credential data, etc. In some examples, payment data also includes a payment amount indicating an amount of the requested payment and/or purchase data describing a purchase for which the payment is compensation.

At operation 704, the mobile wallet application may determine an issuer of the payment element indicated by the payment data. At operation 706, the mobile wallet application may determine if the payment described by the payment data may be processed by the limited payment network 120. For example, a payment may be processed by the limited payment network 120 if the payment element is issued by an issuer that can receive payment authorization request messages via the limited payment network 120. In some examples, the mobile wallet application may store and/or query a list of issuers that support payments via the limited payment network 120 and compare the issuer determined at operation 704 to the list. If the issuer is on the list, then the mobile wallet application may process the payment utilizing the limited payment network 120. If the issuer is not on the list, then the mobile wallet application may process the payment utilizing the general payment network 124.

If the general payment network 124 is to be used, the mobile wallet application may obtain a payment authorization for the payment from the issuer using the general payment network 124 at operation 708. For example, the mobile wallet application may send a payment authorization request message to the issuer via the general payment network 124. The issuer may reply, for example, either authorizing the payment or declining the payment. If the payment is authorized, the mobile wallet application may obtain payment from the issuer at operation 710. For example, the mobile wallet application may send a payment request message to the issuer. In return, the issuer may credit an amount of the payment to an account of the mobile wallet application at an acquiring banks, as described here.

If the limited payment network 120 is to be used, the mobile wallet application may, at operation 712, send a payment authorization request message to the issuer via the limited payment network 120. In some examples, similar to the arrangement of FIG. 2, this may involve sending the payment authorization request to a mobile wallet provider system 150. In other examples, similar to the arrangement of FIG. 3, this may involve sending the payment authorization request directly to a financial institution system 152 and/or a mobile wallet management engine 154 associated with the issuer.

At operation 714, the mobile wallet application may obtain payment from the issuer. For example, in examples similar to the arrangement of FIGS. 1 and 2, the issuer system 116A, 116N may credit the payment amount to an account associated with the mobile wallet application managed by an acquiring financial institution system 122. In examples similar to the arrangement of FIG. 3, the issuer and acquiring bank may be the same financial institution associated with the financial institution system 152. The financial institution system 152 may credit an account associated with the mobile wallet application with the payment amount.

Figure 8:
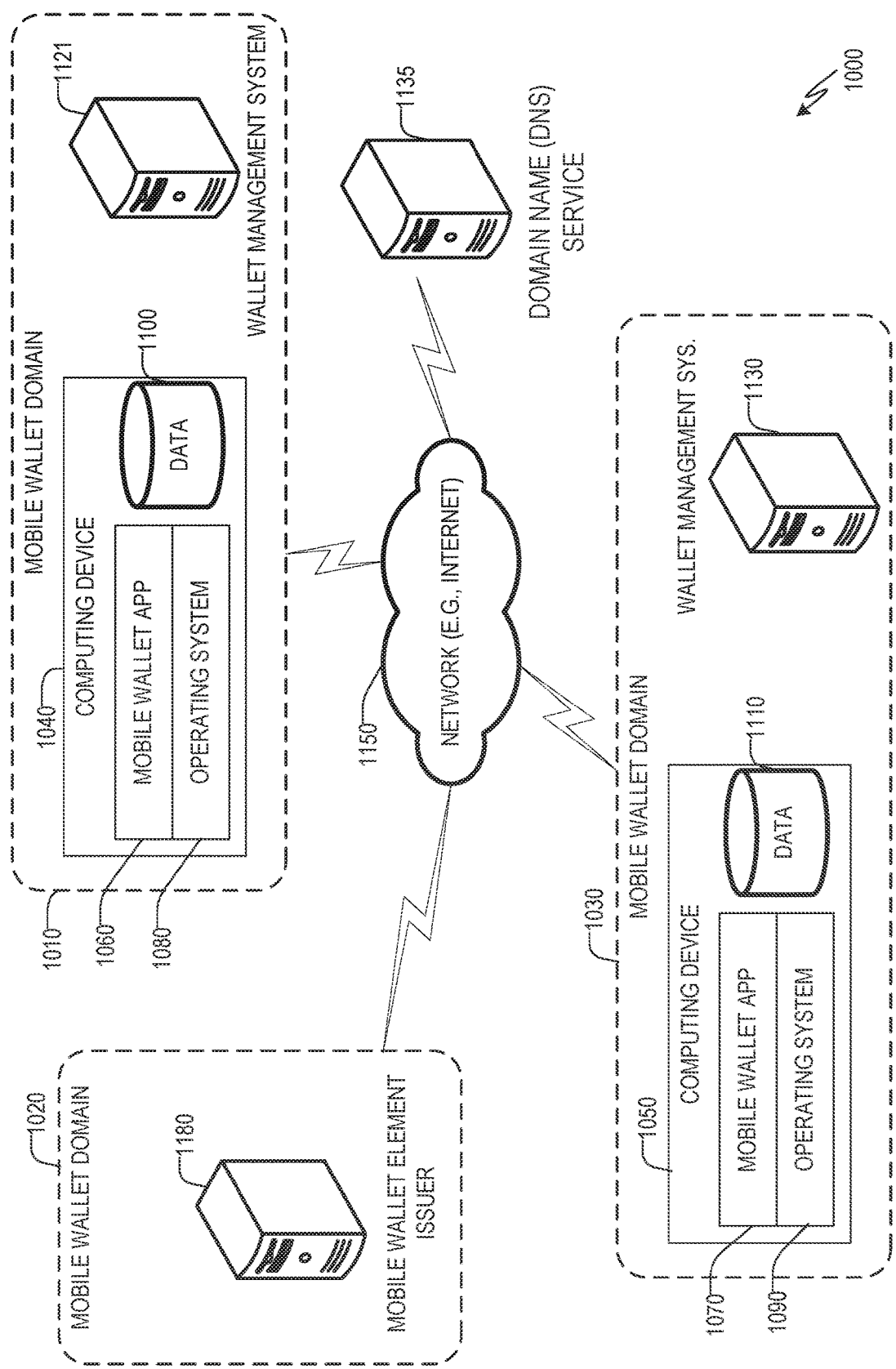
FIG. 8 is a diagram showing one example of an environment for secure digital communication between mobile wallet applications.

FIG. 8 is a diagram showing one example of an environment 1000 for secure digital communication between mobile wallet applications. The components and techniques described with respect to FIG. 8 may be utilized in some examples of any of the methods and systems described herein. For example, the environment 1000 illustrates example ways that mobile wallet applications may transfer payment data to one another. This may describe how a client mobile wallet application 162N transfers payment data to the mobile wallet back end application 166 executing at the back end computing device 164. In the example environment 1000, three mobile wallet domains 1010, 1020, and 1030 are shown. Mobile wallet domains 1010 and 1030 include two respective user computing devices 1040 and 1050 with mobile wallet applications 1060 and 1070 executing along with operating systems 1080 and 1090 respectively. Mobile wallet domains may be provided by one or more mobile wallet providers (e.g., mobile wallet providers implementing the respective wallet management systems 1121, 1130). Mobile wallet providers may administer one or more mobile wallet domains. The mobile wallet applications 1060 and 1070 may originate from the wallet management systems 1121 and 1130, respectively. Wallet management systems 1121, 1130, in some examples, may operate similarly to the mobile wallet provider system 150 described herein. Similarly, mobile wallet applications 1060, 1070 may operate in a manner similar to the mobile wallet application 102 described herein.

Mobile wallet applications 1060 and 1070 store one or more data structures that store digital representations of payment and non-payment elements of the user. In some examples, this may be identification information (driver's licenses), financial information (credit card information, bank card information, bank account information), and the like. A digital representation may include one or more information fields stored by the mobile wallet and providing information about the user (e.g., account number, user age, user name, and the like) and in some cases verification (e.g., a certificate or other means to ensure that the digital representation is authentic). Operating systems 1080 and 1090 provide services to the mobile wallets (and other applications) on the computing devices 1040 and 1050 such as scheduling tasks for execution, controlling peripherals, providing an interface to the hardware, managing memory, and the like.

Computing devices 1040 and 1050 may also contain data storage devices 1100 and 1110 that may store mobile wallet application data, including mobile wallet messages, encryption keys, address books, data structures storing information about the user of the computing device (such as information on payment and non-payment elements of the mobile wallet), and the like. Mobile wallet domains 1010 and 1030 may have wallet management systems 1121 and 1130 that provide mobile wallet communication services to the mobile wallets within their respective mobile wallet domains 1010 and 1030. Example services include message forwarding, message storage, message encryption, and the like.

Domain Name Service (DNS) 1135 translates a domain name (e.g., abc.mwallet) to an Internet Protocol (IP) address that may be utilized to send messages to that mobile wallet domain. Mobile wallet domains 1010, 1020, 1030, and DNS 1135 may communicate over computer network 1150, which in some examples may be or include the Internet. Mobile wallet domain 1020 may include mobile wallet element issuer 1180. Mobile wallet element issuer 1180 may contain applications which may communicate with mobile wallets in other mobile wallet domains, according to the present disclosure. Example mobile wallet issuers include banks, merchants, government organizations, corporations, or the like.

Mobile wallet element issuer 1180 may issue one or more identification cards, credit cards, bank cards, bank accounts, or the like to one or more users of mobile wallets (e.g., mobile wallet applications 1060 and 1070). Mobile wallet element issuer 1180 may include one or more of the components of wallet management systems 1121 and 1130 as shown in FIG. 2 (e.g., PKS, MTA, MSA). In some examples, these elements may be issued by sending the digital representations to one or more mobile wallet recipients. Thus, using the disclosed techniques, it may be possible to automatically provision and populate a mobile wallet with little consumer effort.

Figure 9:
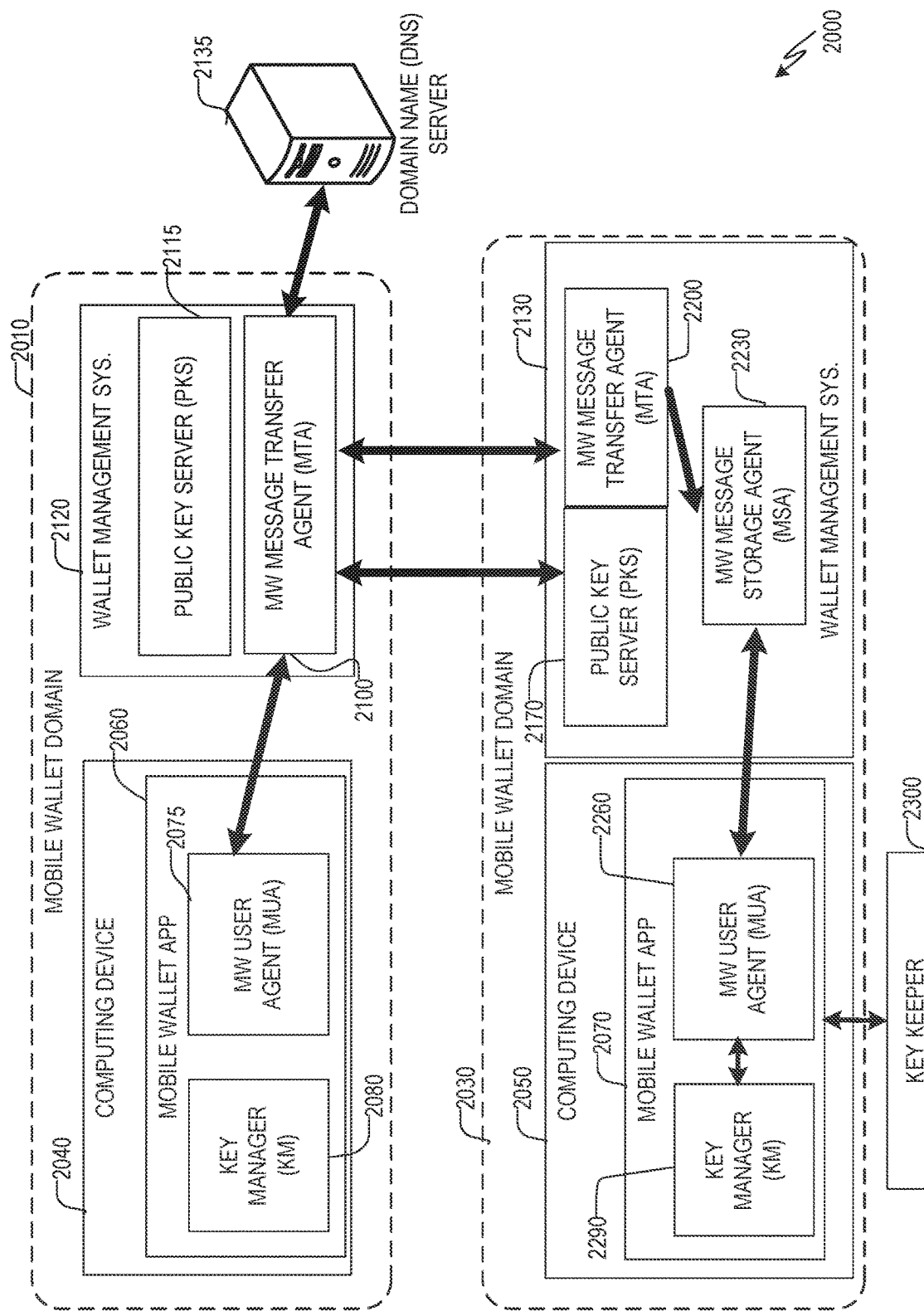
FIG. 9 is a diagram showing one example of a mobile wallet to mobile wallet secure digital communication.

FIG. 9 is a diagram showing one example of a mobile wallet to mobile wallet secure digital communication 2000. Mobile wallet domain 2010 may be an example implementation of mobile wallet domain 1010, and mobile wallet domain 2030 may be an example implementation of mobile wallet domain 1030 of FIG. 8. Similarly, computing device 2040, mobile wallet application 2060, and wallet management system 2120 may be an example implementation of computing device 1040, mobile wallet application 1060 and wallet management system 1121 respectively of FIG. 8 in some examples. Computing device 2050, mobile wallet application 2070, and wallet management system 2130 may be an example implementation of computing device 1050, mobile wallet application 1070, and wallet management system 1130, respectively, of FIG. 8 according to some examples.

A first mobile wallet application 2060 executing on a computing device 2040 in a first mobile wallet domain 2010 is sending a message to a second mobile wallet application 2070 executing on a second computing device 2050 in a second mobile wallet domain 2030. Mobile wallet application 2060 may include a mobile wallet user agent (MUA) 2075 and a key manager (KM) 2080. The MUA 2075 allows users to compose, send, and retrieve mobile wallet (MW) messages. Key manager 2080 may do one or more of: create, provision, register, store, and manage one or more cryptographic keys. Key manager 2080 may register (or obtain) a public key with a certificate authority (not shown for clarity) and with a PKS 2115.

A mobile wallet application 2060 may provide one or more GUIs to allow users to compose and edit one or more mobile wallet messages. Before sending a message, the MUA 2075 requests the recipient's public key from the MTA 2100. The PKS 2115 and MTA 2100 may be provided by the wallet management system 2120 of the mobile wallet domain 2010. The PKS 2115 and MTA 2100 may be provided by the same computing device, or different computing devices. While the PKS 2115 and MTA 2100 are shown as part of the wallet management system 2120, they may be provided by separate entities. The MTA 2100 and PKS 2115 are accessible to computing device 2040 and other computing devices both within the mobile wallet domain 2010 and other devices within other mobile wallet domains, over one or more networks (not shown for clarity). These networks may include one or more portions of a LAN, WAN, MAN, the Internet, cellular networks, and the like.

The MTA 2100 first examines the message to determine which mobile wallet domain the recipient is in. If the mobile wallet domain is mobile wallet domain 2010, the MTA 2100 may retrieve the public key from the PKS 2115 of mobile wallet domain 2010. If the mobile wallet domain is in another domain, then the MTA 2100 checks its DNS cache to determine if it already knows the IP address of the recipient mobile wallet domain's PKS. If the mobile wallet domain is not in the DNS cache, the MW sends a lookup message to DNS server 2135 using the Domain Name System Protocol. DNS server 2135 responds with an IP address of the mobile wallet domain (or an error). Once the address is determined (either through the cache or the DNS server 2135), the MTA 2100 sends a message to a PKS 2170 asking for the public key of the recipient mobile wallet (e.g., mobile wallet application 2070). The response includes the recipient's public key. The public key is then passed by the MTA 2100 to the MUA 2075.

In some examples, the public key is passed to the MTA 2100 in the form of a digital certificate issued by a Certificate Authority (CA). A digital certificate typically includes the name and other identification information of the holder, the holder's public key, the name of the CA, a serial number, and a validity period. The information in the digital certificate is signed by the issuing CA using the issuing CA's private key. The signature can be verified using the CA's public key (which is known and may be pre-installed on the computing devices). This may serve as a means to verify that the public key is owned by the recipient. For example, the PKS 2170 may provide a digital certificate created by a trusted CA for the recipient mobile wallet application 2070 in response to the request for the recipient's public key. MUA 2075 (or MTA 2100) may utilize the CA's public key and decrypt the certificate. The certificate may then be checked to determine that the message was not tampered with, and that the public key therein belongs to the mobile wallet application 2070 (e.g., authentication and verification).

Once the MUA 2075 is satisfied with the public key, the 2075 then encrypts the contents of the message with the received public key and sends it to the MTA 2100. The MTA 2100 determines the IP address of the recipient mobile wallet domain's MTA 2200. In some examples, the MTA 2100 utilizes the IP address previously determined from the DNS server 2135 (e.g., using the cache) when retrieving the public key of the recipient. For example, the PKS 2170 and MTA 2200 may have the same IP address, or the IP address of the MTA 2200 may be derivable from the IP address of the PKS 2170. In other examples, a mobile wallet application in mobile wallet domain 2010 may have previously communicated with a mobile wallet in mobile wallet domain 2030 (and thus the MTA 2100 still has the IP address in its cache). In other examples, the MTA 2100 may re-request the IP address from the DNS server 2135.

The MTA 2100 then sends the message to the MTA 2200 of the wallet management system 2130 of the recipient mobile wallet domain 2030 using the determined IP address. MTA 2200 may send a response to MTA 2100 (which may be forwarded to MUA—but this message is not shown for clarity). MTA 2200 may then send the message to the mobile wallet MSA 2230. Note that the wallet management system 2120 may also employ a MSA, but it is not shown for clarity. MSA 2230 may then store the message and alert the MUA 2260 of the recipient mobile wallet application 2070 using a notification. When the MUA is interested in receiving the message, the MUA may request it and the MSA may provide it. The MUA may decrypt the message using its private key. The private key may be maintained in a key manager 2290. Key manager 2290 may communicate with key keeper 2300. Key keeper 2300 may be a remote key storage facility to prevent the loss of the cryptographic keys should the computing device 2050 experience a loss in data. For example, the key manager 2290 may store one or more keys of the mobile wallet application 2070 in the key keeper 2300.

In some examples, the mobile wallet application 2070 may utilize a second cryptographic key to encrypt the private key. The private key may then be stored with the wallet management system 2130 in encrypted form. The second cryptographic key may then be stored with the key keeper 2300 and utilized to decrypt the private key should the computing device 2050 need it. The key keeper 2300 may be under control of the user of computing device 2050. This ensures that the private key is not given to the wallet management system 2130 and thus the user can entrust that no one associated with the wallet management system 2130 can access their messages.

Figure 10:
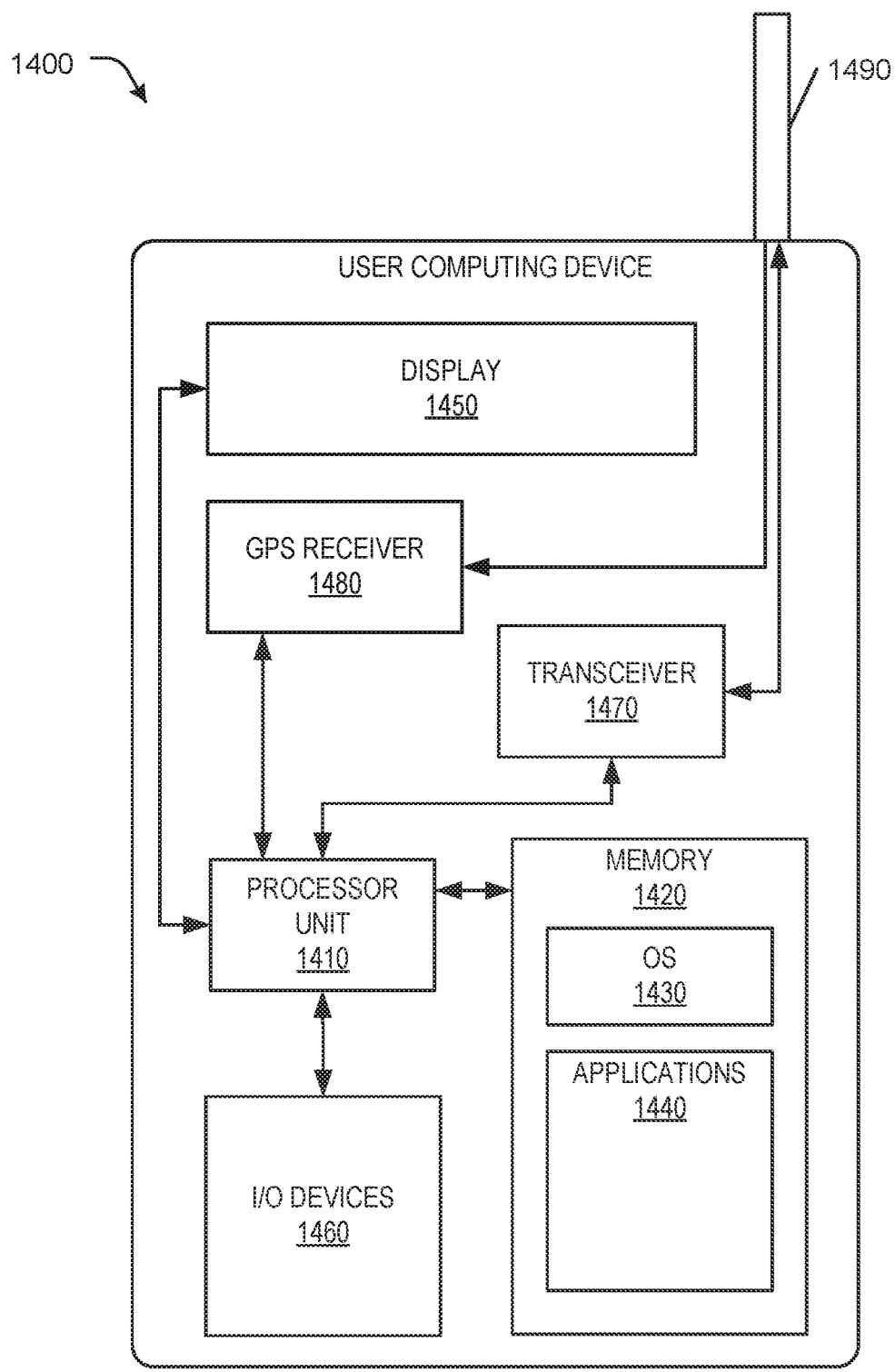
FIG. 10 is a block diagram showing an example architecture of a user computing device.

FIG. 10 is a block diagram showing an example architecture 1400 of a user computing device. The architecture 1400 may, for example, describe any of the computing devices described. The architecture 1400 comprises a processor unit 1410. The processor unit 1410 may include one or more processors. Any of a variety of different types of commercially available processors suitable for user computing devices may be used (for example, an XScale architecture microprocessor, a Microprocessor without Interlocked Pipeline Stages (MIPS) architecture processor, or another type of processor). A memory 1420, such as a Random Access Memory (RAM), a Flash memory, or other type of memory or data storage, is typically accessible to the processor. The memory 1420 may be adapted to store an operating system (OS) 1430, as well as application programs 1440.

The processor unit 1410 may be coupled, either directly or via appropriate intermediary hardware, to a display 1450 and to one or more input/output (I/O) devices 1460, such as a keypad, a touch panel sensor, a microphone, and the like. Such I/O devices 1460 may include a touch sensor for capturing fingerprint data, a camera for capturing one or more images of the user, a retinal scanner, or any other suitable devices. Similarly, in some examples, the processor unit 1410 may be coupled to a transceiver 1470 that interfaces with an antenna 1490. The transceiver 1470 may be configured to both transmit and receive cellular network signals, wireless data signals, or other types of signals via the antenna 1490, depending on the nature of the user computing device implemented by the architecture 1400. Although one transceiver 1470 is shown, in some examples, the architecture 1400 includes additional transceivers. For example, a wireless transceiver may be utilized to communicate according to an IEEE 802.11 specification, such as Wi-Fi and/or a short-range communication medium. Some short-range communication mediums, such as NFC, may utilize a separate, dedicated transceiver. Further, in some configurations, a Global Positioning System (GPS) receiver 1480 may also make use of the antenna 1490 to receive GPS signals. In addition to or instead of the GPS receiver 1480, any suitable location-determining sensor may be included and/or used including, for example, a Wi-Fi positioning system. In some examples, the architecture (e.g., processor unit 1410) may also support a hardware interrupt. In response to a hardware interrupt, the processor unit 1410 may pause its processing and execute an interrupt service routine (ISR).

Figure 11:
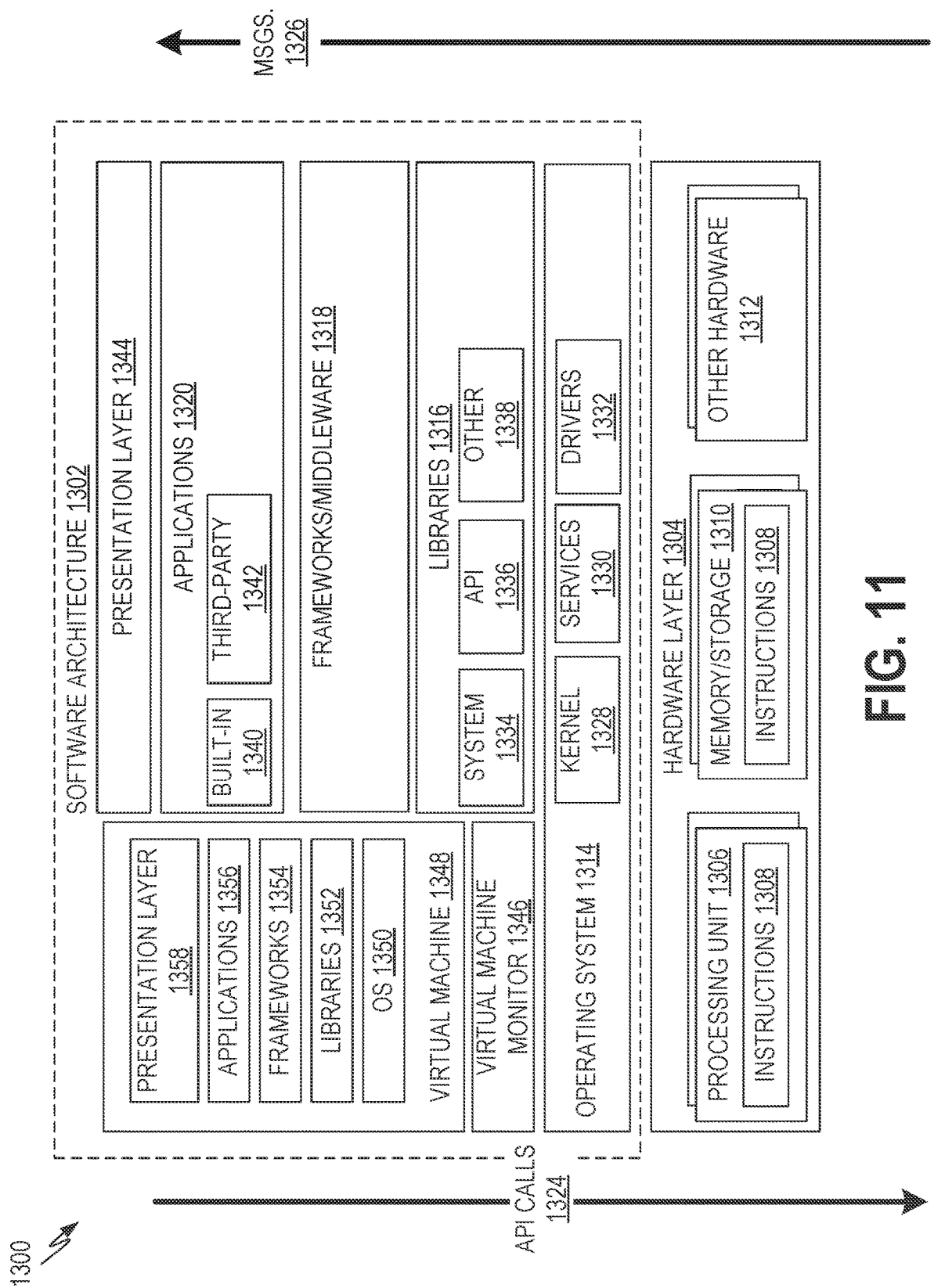
FIG. 11 is a block diagram showing one example of a software architecture for a computing device.

FIG. 11 is a block diagram 1300 showing one example of a software architecture 1302 for a computing device. The architecture 1302 maybe used in conjunction with various hardware architectures, for example, as described herein. FIG. 11 is merely a non-limiting example of a software architecture 1302 and many other architectures may be implemented to facilitate the functionality described herein. A representative hardware layer 1304 is illustrated and can represent, for example, any of the above referenced computing devices. In some examples, the hardware layer 1304 may be implemented according to the architecture 1302 of FIG. 11 and/or the architecture 1400 of FIG. 14.

The representative hardware layer 1304 comprises one or more processing units 1306 having associated executable instructions 1308. Executable instructions 1308 represent the executable instructions of the software architecture 1302, including implementation of the methods, modules, components, and so forth of FIGS. 1-9. Hardware layer 1304 also includes memory and/or storage modules 1310, which also have executable instructions 1308. Hardware layer 1304 may also comprise other hardware as indicated by other hardware 1312, which represents any other hardware of the hardware layer 1304, such as the other hardware illustrated as part of hardware architecture 1400.

In the example architecture of FIG. 11, the software 1302 may be conceptualized as a stack of layers where each layer provides particular functionality. For example, the software 1302 may include layers such as an operating system 1314, libraries 1316, frameworks/middleware 1318, applications 1320, and presentation layer 1344. Operationally, the applications 1320 and/or other components within the layers may invoke application programming interface (API) calls 1324 through the software stack and receive a response, returned values, and so forth illustrated as messages 1326 in response to the API calls 1324. The layers illustrated are representative in nature and not all software architectures have all layers. For example, some mobile or special purpose operating systems may not provide a frameworks/middleware layer 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. In some examples, the services 1330 include an interrupt service. The interrupt service may detect the receipt of a hardware or software interrupt and, in response, cause the architecture 1302 to pause its current processing and execute an ISR when an interrupt is received. The ISR may generate the alert, for example, as described herein.

The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than to interface directly with the underlying operating system 1314 functionality (e.g., kernel 1328, services 1330 and/or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks 1318 (also sometimes referred to as middleware) may provide a higher-level common infrastructure that may be utilized by the applications 1320 and/or other software components/modules. For example, the frameworks 1318 may provide various GUI functions, high-level resource management, high-level location services, and so forth. The frameworks 1318 may provide a broad spectrum of other APIs that may be utilized by the applications 1320 and/or other software components/modules, some of which may be specific to a particular operating system or platform.

The applications 1320 include built-in applications 1340 and/or third-party applications 1342. Examples of representative built-in applications 1340 may include, but are not limited to, a contacts application, a browser application, a book reader application, a location application, a media application, a messaging application, and/or a game application. Third-party applications 1342 may include any of the built-in applications 1340 as well as a broad assortment of other applications. In a specific example, the third-party application 1342 (e.g., an application developed using the Android™ or iOS™ software development kit (SDK) by an entity other than the vendor of the particular platform) may be mobile software running on a mobile operating system such as iOS™, Android™, Windows® Phone, or other user computing device operating systems. In this example, the third-party application 1342 may invoke the API calls 1324 provided by the mobile operating system such as operating system 1314 to facilitate functionality described herein.

The applications 1320 may utilize built-in operating system functions (e.g., kernel 1328, services 1330 and/or drivers 1332), libraries (e.g., system 1334, APIs 1336, and other libraries 1338), frameworks/middleware 1318 to create user interfaces to interact with users of the system. Alternatively, or additionally, in some systems, interactions with a user may occur through a presentation layer, such as presentation layer 1344. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 11, this is illustrated by virtual machine 1348. A virtual machine creates a software environment where applications/modules can execute as if they were executing on a hardware computing device. A virtual machine is hosted by a host operating system (operating system 1314) and typically, although not always, has a virtual machine monitor 1346, which manages the operation of the virtual machine 1348 as well as the interface with the host operating system (i.e., operating system 1314). A software architecture executes within the virtual machine 1348 such as an operating system 1350, libraries 1352, frameworks/middleware 1354, applications 1356, and/or presentation layer 1358. These layers of software architecture executing within the virtual machine 1348 can be the same as corresponding layers previously described or may be different.

Figure 12:
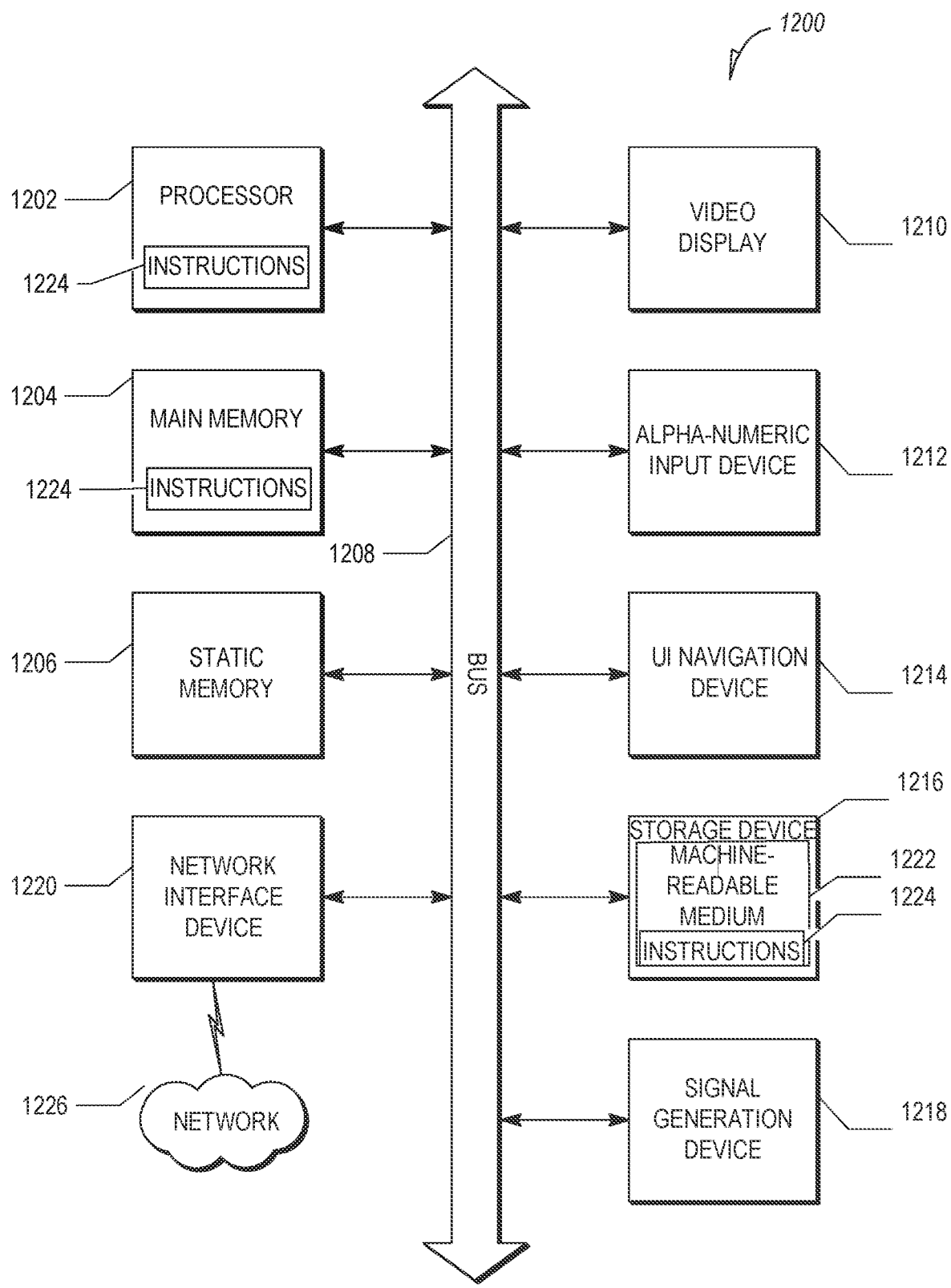
FIG. 12 is a block diagram illustrating a computing device hardware architecture, within which a set or sequence of instructions can be executed to cause the machine to perform examples of any one of the methodologies discussed herein.

FIG. 12 is a block diagram illustrating a computing device hardware architecture 1200, within which a set or sequence of instructions can be executed to cause the machine to perform examples of any one of the methodologies discussed herein. For example, the architecture 1200 may execute the software architecture 1302 described with respect to FIG. 11. The architecture 1200 may operate as a standalone device or may be connected (e.g., networked) to other machines. In a networked deployment, the architecture 1200 may operate in the capacity of either a server or a client machine in server-client network environments, or it may act as a peer machine in peer-to-peer (or distributed) network environments. The architecture 1200 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify operations to be taken by that machine.

Example architecture 1200 includes a processor unit 1202 comprising at least one processor (e.g., a central processing unit (CPU), a graphics processing unit (GPU) or both, processor cores, compute nodes, etc.). The architecture 1200 may further comprise a main memory 1204 and a static memory 1206, which communicate with each other via a link 1208 (e.g., bus). The architecture 1200 can further include a video display unit 1210, an alphanumeric input device 1212 (e.g., a keyboard), and a UI navigation device 1214 (e.g., a mouse). In some examples, the video display unit 1210, input device 1212, and UI navigation device 1214 are incorporated into a touch screen display. The architecture 1200 may additionally include a storage device 1216 (e.g., a drive unit), a signal generation device 1218 (e.g., a speaker), a network interface device 1220, and one or more sensors (not shown), such as a GPS sensor, compass, accelerometer, or other sensor.

In some examples, the processor unit 1202 or other suitable hardware component may support a hardware interrupt. In response to a hardware interrupt, the processor unit 1202 may pause its processing and execute an ISR, for example, as described herein.

The storage device 1216 includes a machine-readable medium 1222 on which is stored one or more sets of data structures and instructions 1224 (e.g., software) embodying or utilized by any one or more of the methodologies or functions described herein. The instructions 1224 can also reside, completely or at least partially, within the main memory 1204, static memory 1206, and/or within the processor unit 1202 during execution thereof by the architecture 1200, with the main memory 1204, static memory 1206, and the processor unit 1202 also constituting machine-readable media. Instructions stored at the machine-readable medium 1222 may include, for example, instructions for implementing the software architecture 1302, instructions for executing any of the features described herein, etc.

While the machine-readable medium 1222 is illustrated in an example to be a single medium, the term "machine-readable medium" can include a single medium or multiple media (e.g., a centralized or distributed database, and/or associated caches and servers) that store the one or more instructions 1224. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 can further be transmitted or received over a communications network 1226 using a transmission medium via the network interface device 1220 utilizing any one of a number of well-known transfer protocols (e.g., HTTP). Examples of communication networks include a LAN, a WAN, the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for managing payments of a merchant, the system comprising at least one processor unit and programmed to perform operations comprising:

receiving, from a first payer device, first payment element data describing a first payment element for making a first payment from an account associated with the first payment element;

determining that the first payment element is processable by a limited payment network and by a general payment network;

responsive to determining that the first payment element is processable by the limited payment network and by the general payment network, sending a first payment authorization message to an issuer of the first payment element via the limited payment network;

receiving, from a second payer device, second payment element data describing a second payment element for making a second payment from an account associated with the second payment element to the merchant;

determining that the second payment element is not to be processed by the limited payment network; and sending a second payment authorization message to an issuer of the second payment element via the general payment network.

2. The system of claim 1, further comprising a point-of-sale (POS) device, wherein the POS device is configured to receive at least one of the first payment element data or the second payment element data.

3. The system of claim 1, the first payment element data being received from a buyer mobile wallet application executing at the first payer device.

4. The system of claim 1, the first payment element data being received from a mobile wallet front end application executing at the first payer device.

5. The system of claim 1, the operations further comprising:

receiving an outgoing payment request message, wherein the outgoing payment request message comprises merchant payment element data describing a merchant payment element for making an outgoing payment; and sending, to a receiving computing device, outgoing payment data comprising the merchant payment element data.

6. The system of claim 5, the operations further comprising receiving the outgoing payment request message from a mobile wallet front end application executing at a client computing device in communication with the system.

7. The system of claim 1, wherein sending the first payment authorization message to the issuer of the first payment element via the limited payment network comprises sending the first payment authorization message to a mobile wallet provider system in communication with the system.

8. The system of claim 1, the operations further comprising:

determining an issuer of the first payment element; and comparing the issuer of the first payment element to a set of issuers to be processed by the limited payment network.

9. A method for managing payments of a merchant, comprising:

receiving, by a computing device and from a first payer device, first payment element data describing a first payment element for making a first payment from an account associated with the first payment element;

determining, by the computing device, that the first payment element is processable by a limited payment network and by a general payment network;

responsive to determining that the first payment element is processable by the limited payment network and by the general payment network, sending, by the computing device, a first payment authorization message to an issuer of the first payment element via the limited payment network;

receiving, by the computing device and from a second payer device, second payment element data describing a second payment element for making a second payment from an account associated with the first payment element to the merchant;

determining, by the computing device, that the second payment element is not to be processed by the limited payment network; and sending, by the computing device, a second payment authorization message to an issuer of the second payment element via the general payment network.

10. The method of claim 9, further comprising:
receiving the first payment element data by a point-of-sale (POS) device; and
sending the first payment element data by the POS device to the computing device.

11. The method of claim 9, further comprising receiving the first payment element data from a mobile wallet front end application executing at the first payer device.

12. The method of claim 9, further comprising:
receiving, by the computing device, an outgoing payment request message, wherein the outgoing payment request message comprises merchant payment element data describing a merchant payment element for making an outgoing payment; and
sending, by the computing device and to a receiving computing device, outgoing payment data comprising the merchant payment element data.

13. The method of claim 12, further comprising receiving, by the computing device, the outgoing payment request message from a mobile wallet front end application executing at a client computing device in communication with the computing device.

14. The method of claim 9, further comprising:
receiving, by the computing device, third payment element data describing a third payment element for making a third payment;
determining, by the computing device, that the third payment element is to be processed by the limited payment network; and
sending, by the computing device, a third payment authorization message to an issuer of the third payment element via the limited payment network.

15. The method of claim 9, wherein sending the first payment authorization message to the issuer of the first payment element via the limited payment network comprises sending the first payment authorization message to a mobile wallet provider system associated with the computing device.

16. The method of claim 9, wherein determining that the first payment element is to be processed by the limited payment network comprises:
determining an issuer of the first payment element; and
comparing the issuer of the first payment element to a set of issuers to be processed by the limited payment network.

17. A non-transitory machine-readable medium comprising instructions thereon that, when executed by a processor unit, cause the processor unit to execute operations comprising:
receiving, from a first payer device, first payment element data describing a first payment element for making a first payment from an account associated with the first payment element;
determining that the first payment element is processable by a limited payment network and by a general payment network;
responsive to determining that the first payment element is processable by the limited payment network and by the general payment network, sending a first payment authorization message to an issuer of the first payment element via the limited payment network;
receiving, from a second payer device, second payment element data describing a second payment element for making a second payment from an account associated with the second payment element;
determining that the second payment element is not to be processed by the limited payment network; and
sending a second payment authorization message to an issuer of the second payment element via the general payment network.

18. The non-transitory machine-readable medium of claim 17, the operations further comprising receiving the first payment element data from a from a mobile wallet front end application executing at the first payer device.

19. The non-transitory machine-readable medium of claim 17, the operations further comprising receiving the first payment element data from a point-of-sale (POS) device.

20. The non-transitory machine-readable medium of claim 17, the operations further comprising receiving the first payment element data from a mobile wallet front end application executing at the first payer device.

* * * * *